No. 820,941. PATENTED MAY 15, 1906.
F. SWARTHOUT.
LOCK WASHER NUT.
APPLICATION FILED JUNE 9, 1905.
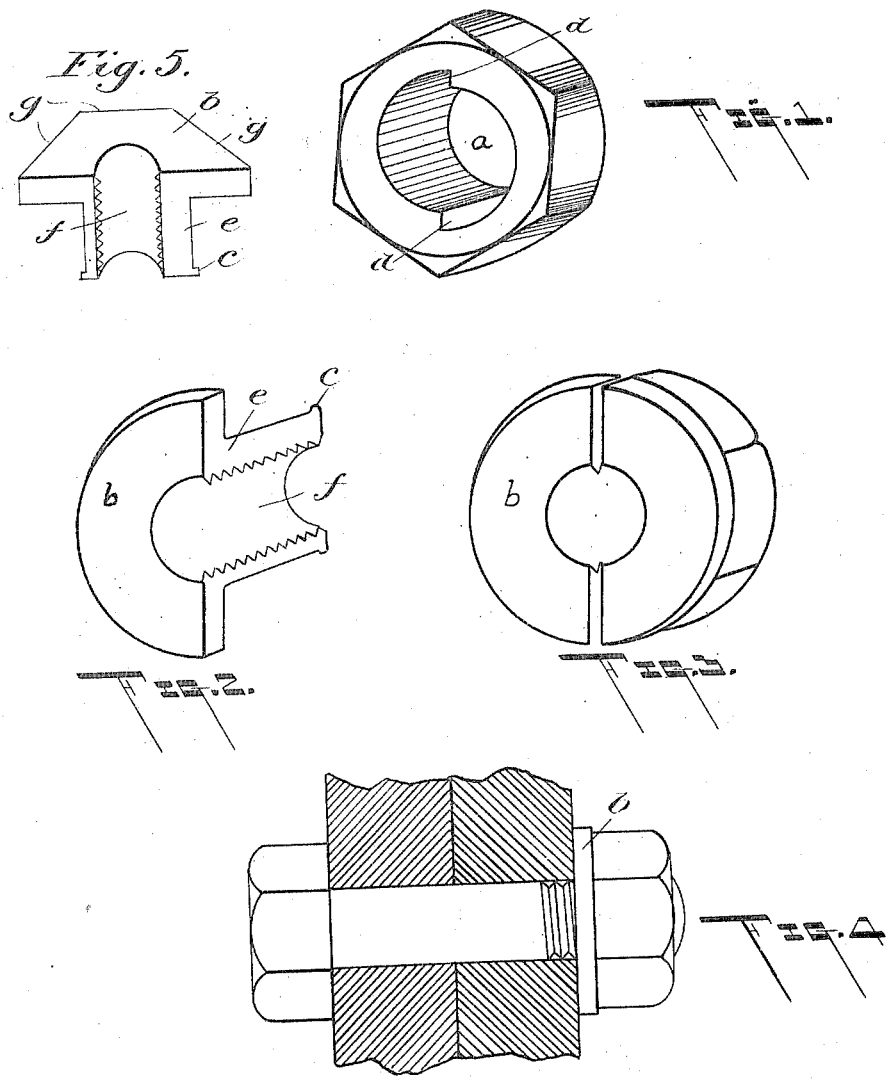

UNITED STATES PATENT OFFICE.

FRANK SWARTHOUT, OF SAGINAW, MICHIGAN.

LOCK WASHER-NUT.

No. 820,941.     Specification of Letters Patent.     Patented May 15, 1906.

Application filed June 9, 1905. Serial No. 264,373.

*To all whom it may concern:*

Be it known that I, FRANK SWARTHOUT, a citizen of the United States, residing at Saginaw, in the county of Saginaw, State of Michigan, have invented a new and useful Lock Washer-Nut, of which the following is a specification.

My invention relates to lock-nuts composed of three parts, of which there are two jaws with a sectional washer attached to each and the nut or locking device.

Figure 1 represents a face view of the nut, showing shape of the hole $a$ through the nut. Fig. 2 represents one of the two jaws, showing sectional washer $b$ at one end, also the small shoulder at opposite end of jaw. Fig. 3 represents the two jaws in position in the nut and the forming of a complete washer by the two sections $b$. Fig. 4 represents the nut in use on a bolt. Fig. 5 represents one of the jaws with the bearing-surface $b$ hexagon shape.

Each half of the hole in the nut is offset from the center, making it a double eccentric. The jaws are also made on an eccentric, so as to bring the threaded parts $f$ of the jaws together in the center of the nut to receive the bolt. The hole in the nut is so formed as to bring the shoulders $d$ in the hole in the nut against the wide sides $e$ of the jaws in order that the nut may be turned on like an ordinary nut.

The small shoulder $c$, as may be seen in Fig. 2, at the end of the jaw by fitting into a corresponding countersunk place in the nut prevents it from slipping off the jaws when in use.

The washer or bearing-surface $b$ may be any shape desired, as shown in Figs. 2 and 5. It is round when the nut is to remain permanently in position, and when it is to be removed it is then made the same shape as the nut.

The term "sectional washer" is the flange $b$ on the jaws, and as the two form a complete washer or bearing-surface for the nut when the jaws are placed in position each flange would be a section of a washer.

When the nut is being turned on, it is always unlocked, as the jaws are being turned on the bolt by the shoulders $d$ in the nut.

To lock the nut after it is turned on sufficiently tight, reverse the motion, as if to turn it off, and the nut slides upon the jaws, changing the relation of the diameters of the hole in the nut and the jaws, forcing the threads of the jaws firmly into the threads of the bolt.

To remove the nut, first turn as if to tighten it. By this motion the nut turns on the jaws, releasing the pressure on them and unlocking them and allowing them to be turned on the bolt by bringing the longest diameter of the hole in the nut to correspond with the longest diameter of the jaws. This brings the shoulders $d$ up against the wide sides $e$ of the jaws, and the faces $g$ of the washer, as shown in Fig. 5, are then parallel with the sides of the nut and allowing the wrench to slip up so as to include the washer with the nut. Then all may be turned off together.

A nut such as I have described as my invention is shown applied on a bolt in Fig. 4, showing the solid washer $b$ or bearing-surface held in an immovable position by the firm locking of the jaws, and thereby preventing the nut from receiving any friction or jar tending to loosen or unlock it, making it absolutely a perfect lock-nut.

Having thus described my invention, I claim as new and desire to secure by Letters Patent—

The combination of two jaws screw-threaded for engagement with a bolt, the outside surface of each jaw being eccentric, each of said jaws having at one end thereof a bearing-surface and at the other end a shoulder, and an unthreaded nut the bore in said nut being a double eccentric and having shoulders formed therein for engagement with the edge of said jaws, said nut adapted to lock said jaws when turned in one direction and to unlock the same when turned in the opposite direction, and held on said jaws by said shoulders.

FRANK SWARTHOUT.

Witnesses:
ALBERT V. LINTON,
J. A. MATTHEWS.